United States Patent [19]

Matsuo

[11] Patent Number: 5,508,749
[45] Date of Patent: Apr. 16, 1996

[54] SAG COMPENSATION CIRCUIT FOR A VIDEO SIGNAL

[75] Inventor: Tomohide Matsuo, Tokyo, Japan

[73] Assignee: NEC Corporation, Tokyo, Japan

[21] Appl. No.: 336,196

[22] Filed: Nov. 2, 1994

[30] Foreign Application Priority Data

Nov. 2, 1993 [JP] Japan .................................. 5-273925

[51] Int. Cl.[6] ........................................ H04N 5/04
[52] U.S. Cl. ......................... 348/500; 348/521; 348/695
[58] Field of Search ........................................ 348/500, 521, 348/689, 695, 525, 684, 910, 678, 705, 645, 649; H04N 5/18, 5/04, 5/94, 5/16

[56] References Cited

U.S. PATENT DOCUMENTS

| | | | |
|---|---|---|---|
| 4,414,572 | 11/1983 | Flory . | |
| 4,626,910 | 12/1986 | Kawamura | 348/684 |
| 4,658,297 | 4/1987 | Nomura | 348/684 |
| 4,843,470 | 6/1989 | Wook | 348/525 |
| 5,008,753 | 4/1991 | Kitaura et al. . | |
| 5,021,886 | 6/1991 | Shibayama | 348/695 |
| 5,142,354 | 8/1992 | Suzuki et al. . | |

FOREIGN PATENT DOCUMENTS

| | | |
|---|---|---|
| 0120586 | 10/1984 | European Pat. Off. . |
| 4032724 | 5/1991 | Germany . |
| 57-131175 | 8/1982 | Japan . |
| 59-218080 | 12/1984 | Japan . |
| 62-272766 | 11/1987 | Japan . |
| 1-041576 | 2/1989 | Japan . |
| 4-096476 | 3/1992 | Japan . |
| 5-284384 | 10/1993 | Japan . |
| 2168566 | 6/1986 | United Kingdom . |
| 2189109 | 10/1987 | United Kingdom . |
| WO93/21727 | 10/1993 | WIPO . |

OTHER PUBLICATIONS

"An AGC System Design Based Upon the DC Restoration and the Dynamic Characteristics", IEEE, Nov. 1970, vol. BTR–16, No. 4, pp. 329–338.

*Primary Examiner*—James J. Groody
*Assistant Examiner*—Sherrie Hsia
*Attorney, Agent, or Firm*—Young & Thompson

[57] ABSTRACT

A first clamp circuit clamps a tip of a synchronization signal of input video signal in accordance with a synchronization signal generated from a synchronization signal generator and outputs a clamped video signal. A level detector detects a level of a tip of a synchronization signal of the clamped video signal. A converter converts the detected level to a reference level signal so that the greater the detected level becomes, the smaller the reference level signal becomes. A second clamp circuit clamps the tip of the synchronization signal of the clamped video signal to the reference level signal and outputs an output video signal. Thus, the second clamp circuit compensates a remaining sag component included in the input video signal accurately.

9 Claims, 5 Drawing Sheets

5,508,749

SAG COMPENSATION CIRCUIT FOR A VIDEO SIGNAL

BACKGROUND OF THE INVENTION

This invention relates to a sag compensation circuit for a video signal for compensating a sag of the video signal caused by loss of a low frequency component of the video signal.

If an input video signal includes a sag component, a luminance gradient, which is not included in the original picture, appears in a reproduced video signal on a display or the like and results in a degradation of picture quality. In order to improve the picture quality, the sag must be compensated.

Referring to FIGS. 1 and 2, two examples of a conventional sag compensation circuit will now be described.

FIG. 1 shows a block diagram of a first conventional sag compensation circuit. The first conventional circuit consists of:

a clamp circuit 2 for clamping a tip, or a peak of a synchronization signal of an input video signal 1 to a reference voltage in accordance with a generated synchronization signal and for outputting an output video signal 8; and a synchronization signal generator 3 for generating the generated synchronization signal based on the input video signal.

The clamp circuit 2 includes:

a capacitor 21 having one electrode connected to the input video signal and another electrode connected to one end of a switch 23;

a Clamp Pulse Generator (CPG) 22 for generating a clamp pulse signal in accordance with the generated synchronization signal;

a Reference Voltage Source (RVS) 24 for supplying the reference voltage; and the switch 23, the other end of which is connected to the reference voltage source, the switch 23 opens or closes in accordance with the clamp pulse signal.

The synchronization signal generator 3 generates the generated synchronization signal which synchronizes with the synchronization signal of the input video signal. In response to the generated synchronization signal, the clamp pulse generator 22 generates the clamp pulse signal which causes the switch 23 to close at the tip of the synchronization signal of the input video signal. By the operations of the switch 23 and the capacitor 21, a predetermined portion of an output video signal 8 (for example, a tip of a synchronization signal of the output video signal) is clamped, or level-shifted to near the reference voltage of the reference voltage generator 24.

However, the first conventional sag compensation circuit has a problem that a small residual sag component remains in the output video signal. This is because a resistance component of the switch 23 prevents a tip level of a synchronization signal of the output video signal from being set to the reference voltage accurately.

FIG. 2 shows a block diagram of a second conventional sag compensation circuit, which is described in Japanese Laid-Open Patent Publication No. 62-272766 (1987).

As shown in FIG. 2, the second conventional circuit includes:

an adder 95 for adding an amplified signal of a DC amplifier 98 to an input video signal 1;

a DC inverting amplifier 96 for inverting and amplifying an output of the adder 95 and outputting an output video signal 8;

a sync-tip detector 97 for detecting a voltage of a tip of a synchronization signal of the output video signal 8 and for holding the voltage until the arrival of the next tip of the synchronization signal of the input video signal; and the DC amplifier 98 for amplifying the held voltage of the sync-tip detector 97 and for outputting the amplified signal.

The input video signal 1 is added to an output of the DC amplifier 98 in the adder 95, an output which is inverted and DC-amplified in the DC inverting amplifier 96 in order to output the output video signal 8. The output video signal is also supplied to the sync-tip detector 97. The sync tip detector detects a DC level of a tip of a synchronization signal of the output video signal and holds the DC level until the arrival of the next tip. The DC amplifier amplifies the DC level and supplies the amplified signal to the adder 95.

When the tip of the input video signal 1 increases, the amplified signal of DC amplifier 98 decreases and vice versa, because the DC inverting amplifier 96 and the DC amplifier 98 have a different polarity of amplification relative to each other. Thus, the sag in the input video signal can be compensated.

The second conventional circuit overcomes the problem of the first conventional circuit. However, the second conventional circuit has the following new problem. In the second conventional circuit, when an impulse noise or the like is included in the detected level, the impulse noise appears in the adder 95 output and circulates in the closed loop of FIG. 2. This circulation degrades the picture quality. Therefore, the second conventional circuit does not accurately compensate for the sag when the input video signal is noisy.

SUMMARY OF THE INVENTION

It is therefore a principal object of the invention to provide a sag compensation circuit of a video signal which accurately compensates a sag included in the input video signal even when the input video signal is noisy.

According to the invention, there is provided a sag compensation circuit for a video signal comprising:

a synchronization signal generator for generating a synchronization signal in synchronism with a video signal synchronization signal;

a first clamp circuit for clamping a predetermined portion of the video signal synchronization signal to a fixed level in accordance with the generated synchronization signal and for outputting a clamped video signal;

a level detector for detecting a level of the predetermined portion of the clamped video signal synchronization signal in accordance with the generated synchronization signal and for outputting the level as a detected level;

a converter for converting the detected level to a reference level signal so that the larger the detected level becomes the smaller the reference signal becomes; and a second clamp circuit for clamping the predetermined portion of the clamped video signal to the reference level signal in accordance with the generated synchronization signal and for outputting an output video signal.

DESCRIPTION OF THE PREFERRED EMBODIMENTS

Figure 3:
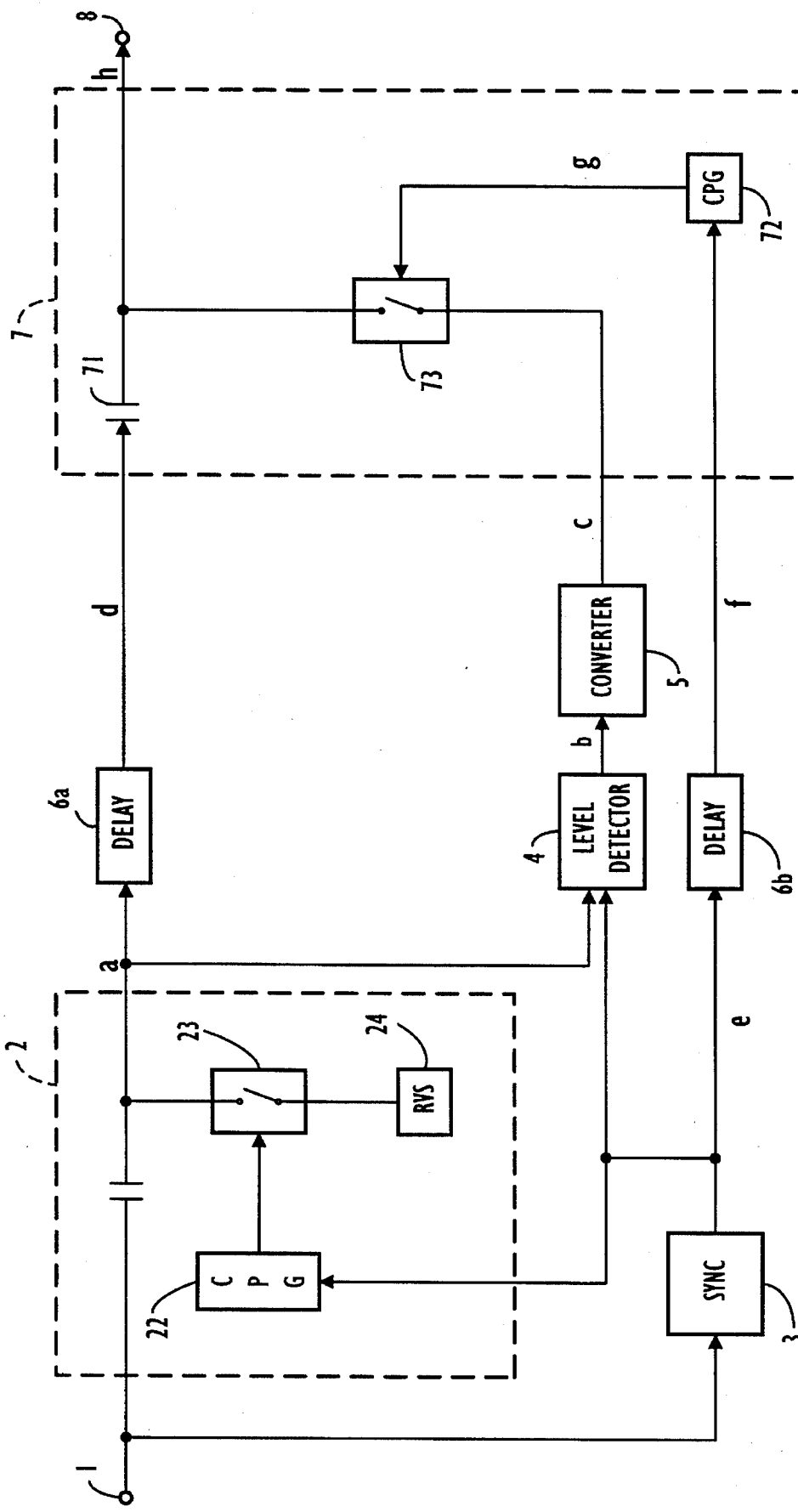
FIG. 3 shows a block diagram of a preferred embodiment of the invention.

Referring to FIG. 3, a preferred embodiment of the invention will now be described. As shown in FIG. 3, the preferred embodiment of the invention comprises:

- a synchronization signal generator 3 for generating a generated synchronization signal from an input video signal 1;
- a first clamp circuit 2 for clamping a predetermined portion of a synchronization signal of the input video signal to a fixed reference level in accordance with the generated synchronization signal and for outputting a clamped video signal;
- a level detector 4 for detecting a level of the predetermined portion of the clamped video signal in accordance with the generated synchronization signal and outputting a detected level;
- a converter 5 for converting the detected level to a reference level signal;
- a first delay circuit 6a for delaying the clamped video signal and for outputting a delayed clamped video signal;
- a second delay circuit 6b for delaying the generated synchronization signal and for outputting a delayed synchronization signal; and
- a second clamp circuit 7 for clamping the predetermined portion of the delayed clamped video signal to the reference level signal in accordance with the delayed synchronization signal.

As the predetermined portion, a tip or a pedestal of a synchronization signal of a video signal may be used.

Next, also referring to FIGS. 4A to 4H, operations of the preferred embodiment will be explained. FIGS. 4A to 4H show timing charts for explaining the operations of the preferred embodiment.

Figure 1:
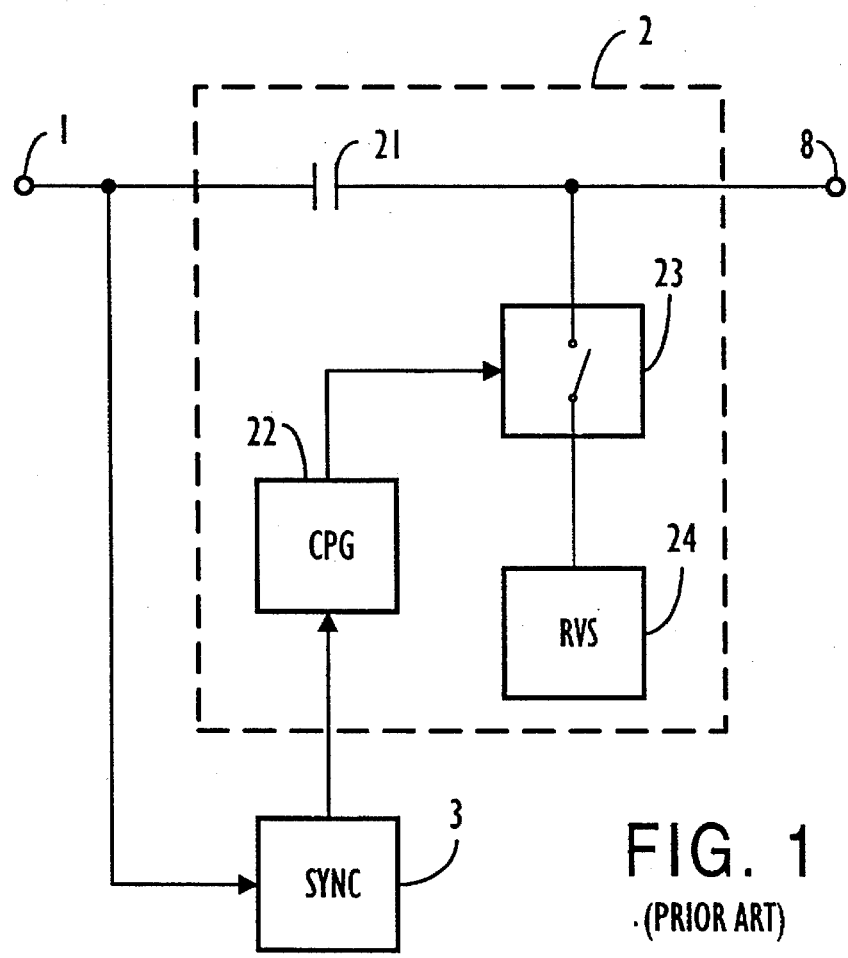
FIG. 1 shows a block diagram of a first conventional sag compensation circuit.
Figure 2:
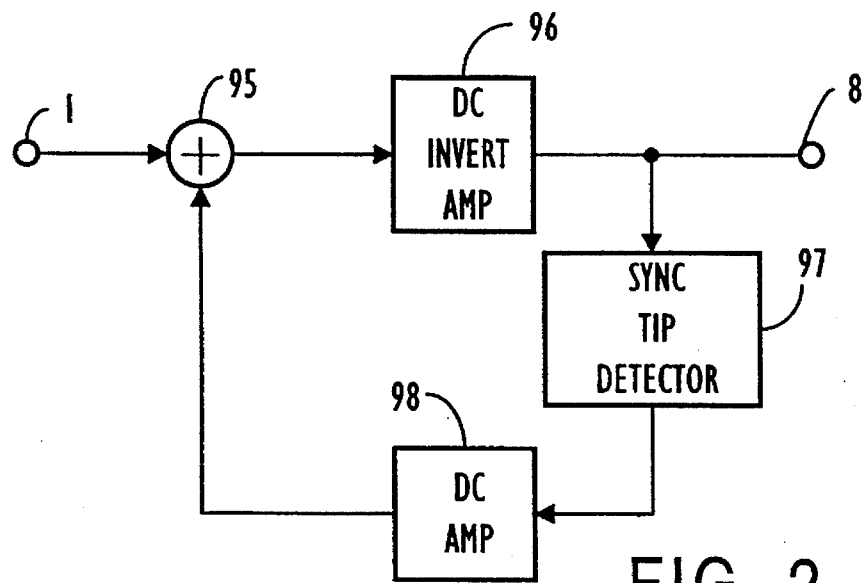
FIG. 2 shows a block diagram of a second conventional sag compensation circuit.
Figure 4A:
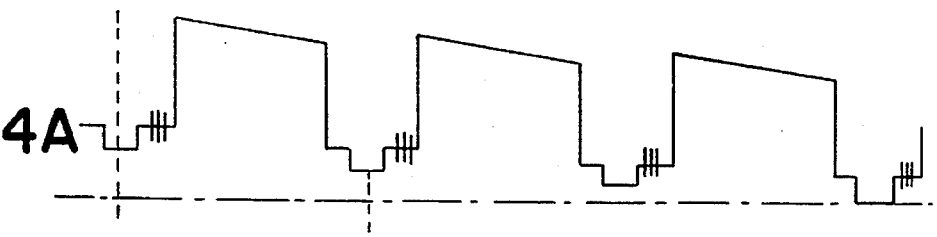
FIGS. 4A to 4H shows a timing chart for explaining operations of the preferred embodiment.

The input video signal 1 is supplied to the first clamp circuit 2 and to the synchronization signal generator 3. Since a combination of the first clamp circuit 2 and the synchronization signal generator is the same as the first conventional sag compensation circuit of FIG. 1, a residual sag component signal appears in the clamped video signal as shown in FIG. 4A.

Figure 4B:
Figure 4C:
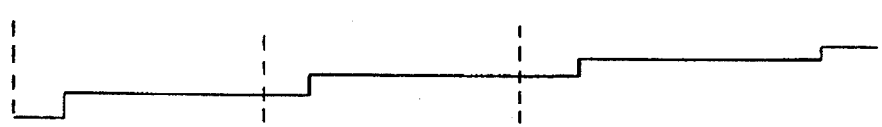
Figure 4D:
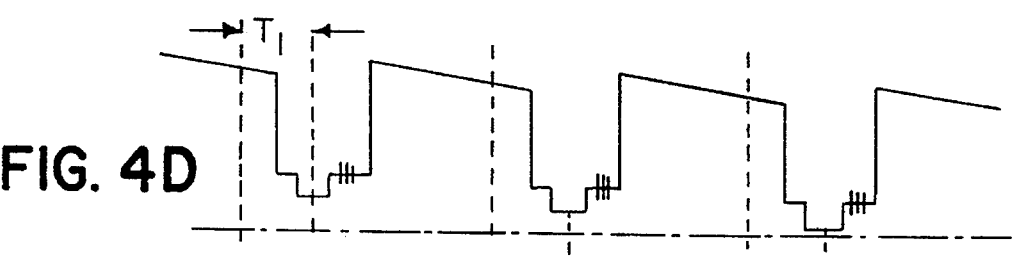
Figure 4E:
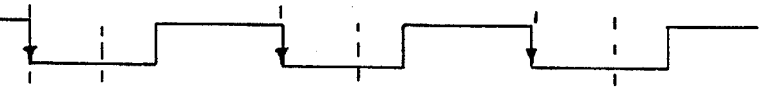

The level detector 4 detects the level of the or a pedestal of the clamped video signal (FIG. 4A) in accordance with the generated synchronization signal, which is shown in FIG. 4E. The detected level at each tip of the clamped video signal is shown in FIG. 4B. One can understand easily that a variation of the detected level indicates the residual sag component. The detected level is supplied to the converter 5.

The converter 5 converts the detected level to the reference level signal so that the greater the detected level becomes, the smaller the reference level signal becomes. FIG. 4C indicates the reference level signal.

Figure 4F:
Figure 4G:
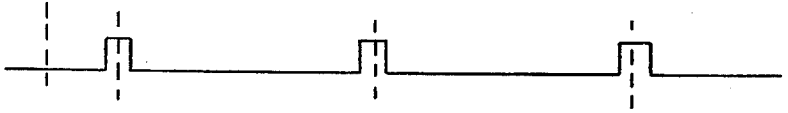

The first delay circuit 6a delays the clamped video signal by $T_1$ and outputs the delayed clamped video signal, which is shown in FIG. 4D, to the second clamp circuit 7. The second delay circuit 6b delays the generated synchronization signal by $T_1$ and outputs the delayed synchronization signal, which is shown in FIG. 4F, to a capacitor 71 of the second clamp circuit 7.

The time $T_1$ corresponds to a sum of processing delays of the level detector 4 and converter 5. In other words, the delay circuits 6a and 6b are provided in order to compensate for the sum of the processing delays. Therefore, if the sum is negligibly small, the delay circuits 6a and 6b may be omitted.

An internal embodiment of the second clamp circuit 7 is substantially the same as that of the first clamp circuit 2, except that the reference level signal is supplied to a second terminal of a switch 73 instead of a provision of a reference voltage source (RVS).

The delayed clamped video signal is supplied to a capacitor 71 and a clamp pulse generator 72 generates a clamp pulse signal (FIG. 4G), which causes the switch 73 to close when a tip of the delayed synchronization signal is inputted therein. Therefore, the second clamp circuit clamps a tip of a synchronization signal of the delayed clamped video signal to the reference level signal.

Figure 4H:
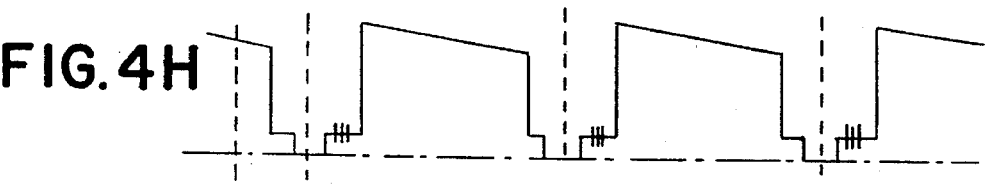

Since the reference level signal becomes small when a level of the tip becomes large, and vice versa, the sag included in the input video signal is fully compensated at an output of the second clamp circuit 7 and the second clamp circuit 7 outputs an output video signal which is free from sag as shown in FIG. 4H.

Figure 5:
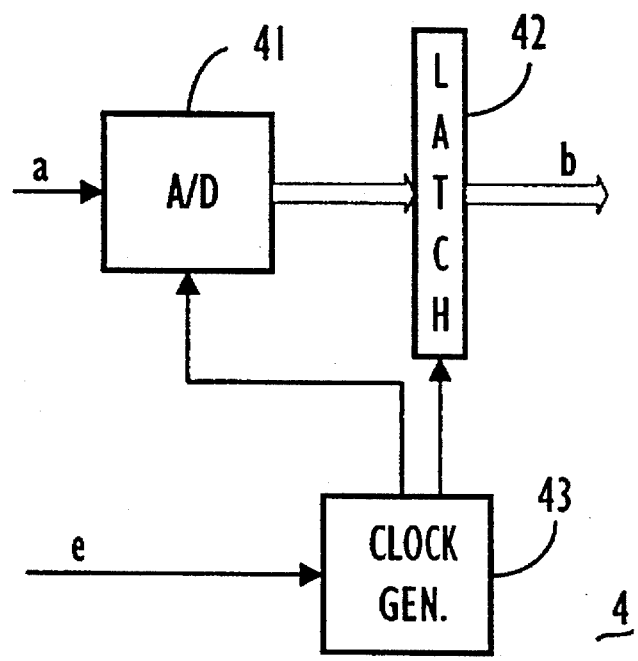
FIG. 5 shows a block diagram of the level detector 4 of FIG. 3.

Next, referring to FIG. 5, an example of the internal embodiment of the level detector 4 and its operation will be described in detail. FIG. 5 shows a block diagram of the level detector 4. The level detector comprises: an analog-to-digital (A/D) converter 41 for digitizing the clamped video signal from the first clamp circuit 2; a clock generator 43 for generating a clock signal for the A/D converter 41 and a latch pulse signal for a latch circuit 42; and the latch circuit which holds the value of an output of the A/D converter 41 at the time identified by the latch pulse signal.

In response to the synchronization signal, the clock generator generates the clock signal for A/D converter 41 and a latch pulse signal for the latch circuit 42.

The A/D converter 41 converts the clamped video signal from the first clamp circuit 2 to digital data in accordance with the clock signal and supplies the digital data to the latch circuit 42. The latch circuit holds a level of a tip of a synchronization signal of the clamped video signal until the next arrival of the next tip, as shown in FIG. 4B. A signal corresponding to the level of the tip, or the detected level is supplied to the converter 5 of FIG. 3.

Figure 6:
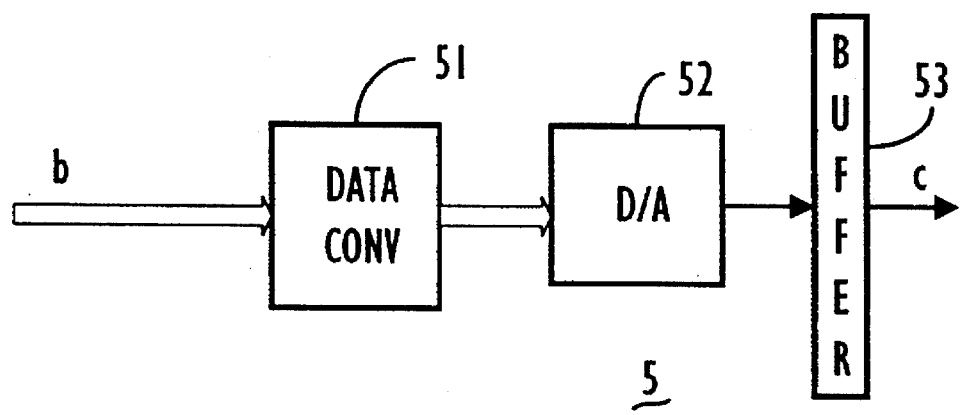
FIG. 6 shows a block diagram of converter 5 of FIG. 3.

Next, referring to FIG. 6, an example of internal embodiment of converter 5 and its operations will be described in detail. As shown in FIG. 6, the converter 5 includes: a data converter 51 for converting the detected level to converted data which decreases when the detected level increases, and vice versa; a digital-to-analog (D/A) converter 52 for converting the converted data to the reference level signal; and a buffer amplifier 53 with low output impedance through which the reference level signal is supplied to the second clamp circuit 7 of FIG. 3.

Figure 7:
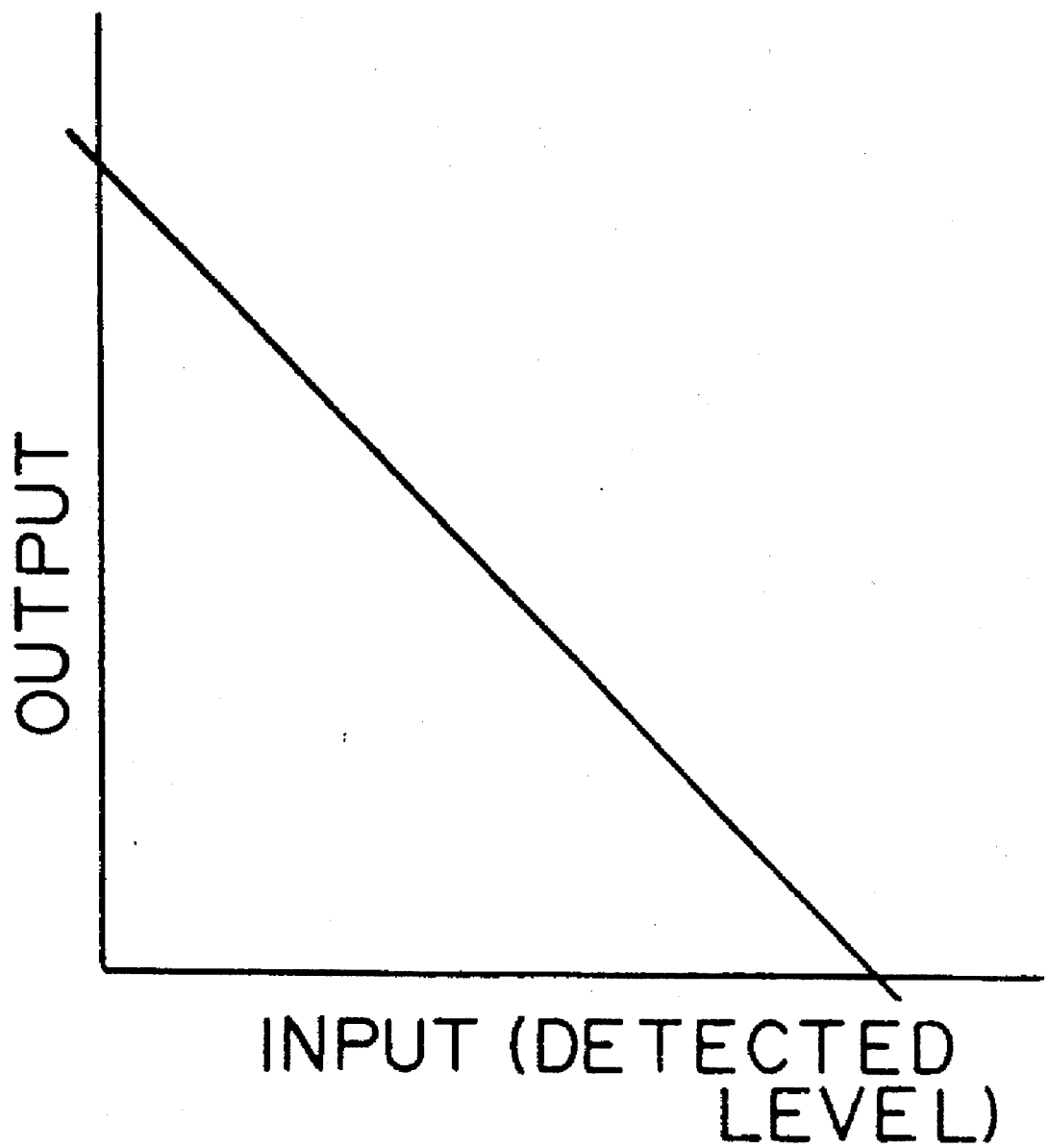
FIG. 7 shows an example of the input-output characteristics of the data converter 51 of FIG. 6.

The data converter may be constituted by a Read Only Memory (ROM) or the like. Each address of the ROM corresponds to each value of the detected level and the corresponding value of the reference level signal is stored in each address. An example of the contents of the data converter 51 is shown in FIG. 7. The data converter converts the detected level to the converted dam, which is supplied to the D/A converter 52 and is converted to an analog signal, or the reference level signal. The reference level signal is supplied to the second clamp circuit 7 via the buffer amplifier 53. Thus, the greater the detected voltage becomes large, the smaller the reference level signal becomes.

While, in the embodiment described above, a quantity indicating a sag is obtained by sampling a tip level of a synchronization signal included in a video signal, it is also obtained by sampling a pedestal level of a synchronization signal of a video signal. Moreover, the first and the second clamp circuit may clamp a pedestal of a video signal inputted therein to the reference voltage and the reference level signal, respectively.

As described above, the present invention provides a sag compensation circuit which compensates a sag included in an input video signal accurately even when the input video signal is noisy.

Modifications of the invention herein disclosed will occur to a person skilled in the art and all such modifications are deemed to be within the scope of this invention as defined by the appended claims.

I claim:

1. A sag compensation circuit for a video signal comprising:
   a synchronization signal generator for generating a synchronization signal in synchronism with a video signal synchronization signal;
   a first clamp circuit for clamping a predetermined portion of said video signal synchronization signal to a fixed level in accordance with said synchronization signal and outputting a clamped video signal;
   a level detector for detecting a level of said predetermined portion of said clamped video signal synchronization signal in accordance with said generated synchronization signal and for outputting a detected level;
   a converter for converting said detected level to a reference level signal so that the larger said detected level becomes, the smaller said reference level signal becomes; and
   a second clamp circuit for clamping the predetermined portion of said clamped video signal to the reference level signal in accordance with said generated synchronization signal and outputting an output video signal.

2. The sag compensation circuit as claimed in claim 1, wherein said level detector comprises:
   an analog-to-digital converter for converting said clamped video signal to a digital video signal; and
   a latch circuit for sampling and holding a value of said predetermined portion of said digital video signal and outputting said value as said detected level.

3. The sag compensation circuit as claimed in claim 2, wherein said converter comprises:
   a data converter for converting said detected level to a converted data so that the larger said detected level becomes, the smaller the converted data becomes; and
   a digital-to-analog converter for converting said converted data to said reference level signal.

4. The sag compensation circuit as claimed in claim 2, wherein said predetermined portion is a tip of said video signal synchronization signal.

5. The sag compensation circuit as claimed in claim 2, wherein said predetermined portion is a pedestal of said video signal synchronization signal.

6. The sag compensation circuit as claimed in claim 2, wherein said second clamp circuit comprises:
   a capacitor having a first electrode connected to said clamped video signal and a second electrode connected to said output video signal;
   a switch having a first terminal connected to said second electrode of said capacitor and a second terminal connected to said reference level signal; and
   a clamp pulse generator responsive to said generated synchronization signal for generating a clamp pulse signal which causes said switch to close at said predetermined portion of said clamped video signal.

7. The sag compensation circuit as claimed in claim 1, wherein said sag compensation circuit further comprises:
   a first delay circuit for delaying said clamped video signal and for supplying the delayed clamped video signal to said second clamp circuit instead of said clamped video signal; and
   a second delay circuit for delaying said generated synchronization signal and for supplying the delayed generated synchronization signal to said second clamp circuit instead of said generated synchronization signal.

8. The sag compensation circuit as claimed in claim 7, wherein said predetermined portion is a tip of said video signal synchronization signal.

9. The sag compensation circuit as claimed in claim 7, wherein said predetermined portion is a pedestal of said video signal synchronization signal.

* * * * *